(12) United States Patent
Montgomery et al.

(10) Patent No.: US 11,038,236 B2
(45) Date of Patent: Jun. 15, 2021

(54) ELECTRIFIED VEHICLE BATTERY PACK ATTACHMENT AND SEALING STRATEGIES

(71) Applicant: FORD GLOBAL TECHNOLOGIES, LLC, Dearborn, MI (US)

(72) Inventors: Kevin A. Montgomery, Royal Oak, MI (US); Hari Krishna Addanki, Novi, MI (US); Michael E. Reibling, Sterling Heights, MI (US); Brock Dunlap, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/587,245

(22) Filed: Sep. 30, 2019

(65) Prior Publication Data

US 2021/0098761 A1 Apr. 1, 2021

(51) Int. Cl.
*B60K 1/04* (2019.01)
*H01M 50/20* (2021.01)
*B60L 50/60* (2019.01)

(52) U.S. Cl.
CPC ............. *H01M 50/20* (2021.01); *B60K 1/04* (2013.01); *B60L 50/66* (2019.02); *B60K 2001/0438* (2013.01); *B60L 2220/10* (2013.01); *H01M 2220/20* (2013.01)

(58) Field of Classification Search
CPC ... B60K 1/04; B60K 2001/9438; B60L 50/60; B62D 25/20; H01M 2220/20
See application file for complete search history.

(56) References Cited

U.S. PATENT DOCUMENTS

| | | | |
|---|---|---|---|
| 8,795,867 B2* | 8/2014 | Kim | H01M 2/10 429/100 |
| 9,722,223 B1* | 8/2017 | Maguire | B60K 1/04 |
| 2018/0062129 A1 | 3/2018 | Hao | |
| 2018/0201110 A1* | 7/2018 | Yin | B60L 50/66 |
| 2018/0334022 A1 | 11/2018 | Rawlinson et al. | |

FOREIGN PATENT DOCUMENTS

WO 2018/212161 A1 11/2018

* cited by examiner

*Primary Examiner* — James A Shiver, II
*Assistant Examiner* — James J Triggs
(74) *Attorney, Agent, or Firm* — David B. Kelley; Carlson, Gaskey & Olds

(57) ABSTRACT

This disclosure details electrified vehicles that are equipped with one or more attachment and sealing assemblies for securing a battery pack to vehicle body components. An exemplary attachment and sealing assembly may establish a mid-span attachment point of the battery pack. The attachment and sealing assembly may include an attachment column and a sealing ring that cooperate to secure the battery pack to the vehicle and to seal openings formed through the battery pack and the vehicle body component.

20 Claims, 4 Drawing Sheets

ELECTRIFIED VEHICLE BATTERY PACK ATTACHMENT AND SEALING STRATEGIES

TECHNICAL FIELD

This disclosure relates to attachment and sealing assemblies for establishing mid-span battery pack attachment points.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A traction battery pack typically powers the electric machines and other electrical loads of the electrified vehicle. The traction battery pack includes a plurality of energy storage devices, such as battery cells, that store energy for powering these electrical loads. The battery cells and various other battery components are typically packaged together inside an enclosure assembly. The enclosure assembly typically provides one or more attachment points for mounting the battery pack to the electrified vehicle.

SUMMARY

A battery pack according to an exemplary aspect of the present disclosure includes, among other things, an enclosure assembly, a battery array housed inside the enclosure assembly, a battery internal structure adjacent to the battery array, an attachment and sealing assembly including an attachment column connected to the battery internal structure and extending through a portion of the enclosure assembly, and a sealing ring received around a portion of the attachment column.

In a further non-limiting embodiment of the foregoing battery pack, the attachment and sealing assembly establishes a mid-span attachment point of the battery pack.

In a further non-limiting embodiment of either of the foregoing battery packs, an attachment assembly establishes a peripheral attachment point of the battery pack.

In a further non-limiting embodiment of any of the foregoing battery packs, the portion of the attachment column is a tube.

In a further non-limiting embodiment of any of the foregoing battery packs, the tube extends through a cover of the enclosure assembly, and an upper edge of the tube abuts against an undersurface of a vehicle body component to which the battery pack is mounted.

In a further non-limiting embodiment of any of the foregoing battery packs, a fastener is secured to a threaded portion of a hollow passage of a tube of the attachment column.

In a further non-limiting embodiment of any of the foregoing battery packs, the attachment column includes a tube that extends through a cover of the enclosure assembly and a stanchion that extends into the battery internal structure.

In a further non-limiting embodiment of any of the foregoing battery packs, a threaded portion of the stanchion engages a threaded opening formed in the battery internal structure.

In a further non-limiting embodiment of any of the foregoing battery packs, the attachment column includes a flange, a tube that extends in a first direction from the flange, and a stanchion that extends in a second direction from the flange.

In a further non-limiting embodiment of any of the foregoing battery packs, a circular ledge is disposed at an interface between the tube and the flange.

In a further non-limiting embodiment of any of the foregoing battery packs, the flange is received against an underside of a cover of the enclosure assembly, and the circular ledge is received against an inner surface of the sealing ring.

In a further non-limiting embodiment of any of the foregoing battery packs, the sealing ring includes a body, a first seal received in a first groove of the body, and a second seal received in a second groove of the body.

In a further non-limiting embodiment of any of the foregoing battery packs, the sealing ring includes a rubber gasket and a threaded internal sleeve.

An electrified vehicle according to another exemplary aspect of the present disclosure includes, among other things, a vehicle body component, a battery pack mounted to the vehicle body component, and an attachment and sealing assembly that establishes a mid-span connection point for securing the battery pack to the vehicle body component. The attachment and sealing assembly includes an attachment column and a sealing ring disposed about a tube of the attachment column.

In a further non-limiting embodiment of the foregoing electrified vehicle, the vehicle body component is a floor pan or a rail of a vehicle frame.

In a further non-limiting embodiment of either of the foregoing electrified vehicles, the attachment column is connected to a battery internal structure of the battery pack.

In a further non-limiting embodiment of any of the foregoing electrified vehicles, a stanchion of the attachment column is received by a threaded opening formed in the battery internal structure.

In a further non-limiting embodiment of any of the foregoing electrified vehicles, the sealing ring includes a body, a first seal received in a first groove of the body, and a second seal received in a second groove of the body. The first seal seals a first opening formed in the vehicle body component and the second seal seals a second opening formed in an enclosure assembly of the battery pack.

In a further non-limiting embodiment of any of the foregoing electrified vehicles, a fastener is connected to the tube of the attachment column. The fastener extends through an opening formed in the vehicle body component, and a threaded stud of the fastener engages a threaded portion formed in a hollow passage of the tube.

In a further non-limiting embodiment of any of the foregoing electrified vehicles, the sealing ring is positioned within a space that extends between the vehicle body component and a cover of the battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrified vehicles that are equipped with one or more attachment and sealing assemblies for securing a battery pack to vehicle body components. An exemplary attachment and sealing assembly may establish a mid-span attachment point of the battery pack. The attachment and sealing assembly may include an attachment column and a sealing ring that cooperate to secure the battery pack to the vehicle and to seal openings formed through the battery pack and the vehicle body component. These and other features are discussed in greater detail in the following paragraphs of this detailed description.

Figure 1:
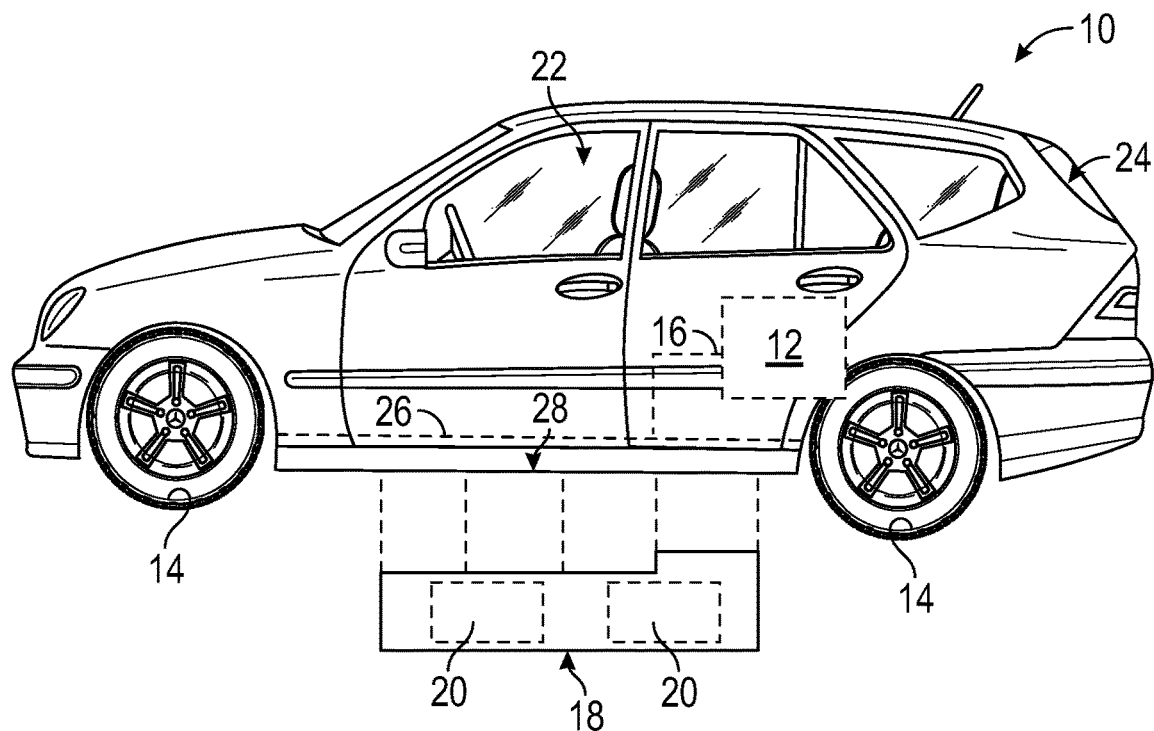
FIG. 1 schematically illustrates an electrified vehicle.
Figure 2:
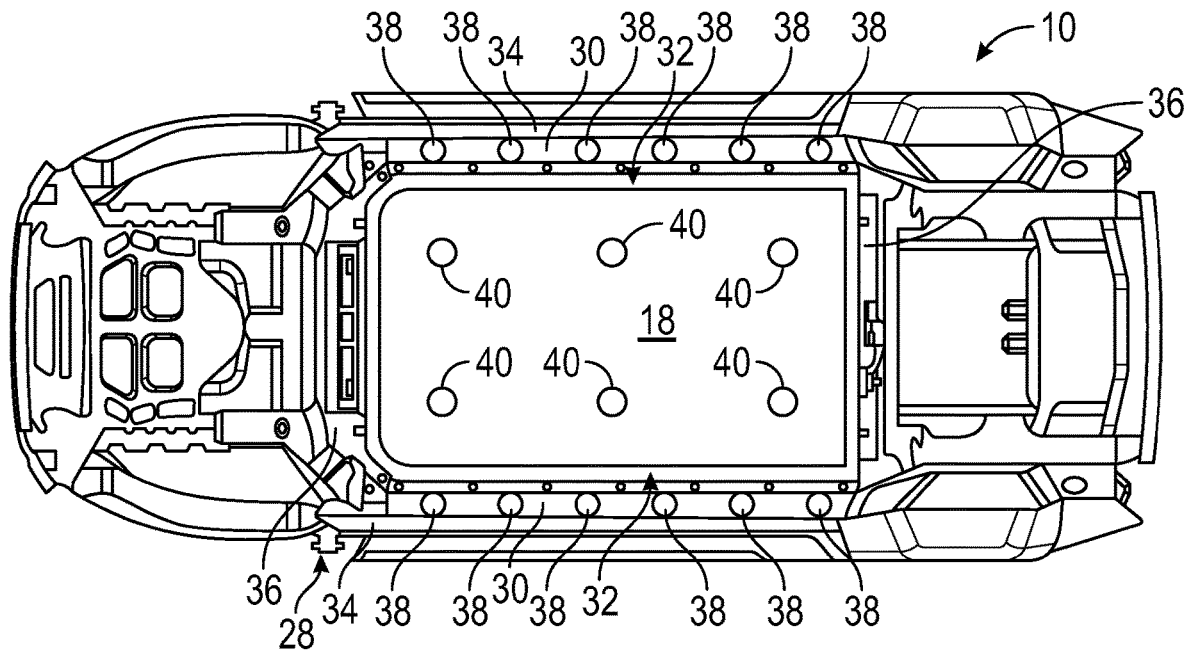
FIG. 2 illustrates an underside of the electrified vehicle of FIG. 1.

FIGS. 1 and 2 schematically illustrate an electrified vehicle 10. The electrified vehicle 10 could be a car, a truck, a van, a sport utility vehicle, a crossover, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

In the illustrated embodiment, the electrified vehicle 10 is a full electric vehicle propelled solely through electric power, such as via one or more electric machines 12, without any assistance from an internal combustion engine. The electric machine 12 may operate as an electric motor, an electric generator, or both. The electric machine 12 receives electrical power from a battery pack 18 and provides a rotational output torque to one or more drive wheels 14 of the electrified vehicle 10.

A voltage bus 16 electrically connects the electric machine 12 to the battery pack 18. The battery pack 18 is an exemplary electrified vehicle traction battery pack. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a trunk, truck bed, etc.) located to the rear of the passenger cabin 22. A floor pan 26 may separate the passenger cabin 22 from a vehicle frame 28, which generally establishes the vehicle underbody. The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers within the passenger cabin 22 or cargo within the cargo space 24.

One or more side rails 30 (see FIGS. 2 and 3) may be used to connect the battery pack 18 to the vehicle frame 28. In an embodiment, one side rail 30 is mounted to each opposing lengthwise side 32 of the battery pack 18. However, other configurations are also contemplated, and thus the total number and mounting locations of the side rails 30 are not intended to limit this disclosure.

The vehicle frame 28 may include a plurality of rails 34 (sometimes referred to as "frame rails" or "beams"). FIG. 2 shows two such rails 34. The rails 34 are spaced apart from one another and extend longitudinally to establish a length of the vehicle frame 28. A plurality of cross members 36 (e.g., two or more) may extend between the rails 34 of the vehicle frame 28. The cross members 36 may generally extend transversely relative to the rails 34 for establishing a width of the vehicle frame 28.

The side rails 30 may be mounted to the rails 34, the cross members 36, or both. In the illustrated embodiment of FIG. 2, one of the side rails 30 is mounted to each of the rails 34.

A plurality of attachment assemblies 38 may be used to mount the battery pack 18 to the side rails 30 and then to mount the side rails 30 to the rails 34 of the vehicle frame 28. The attachment assemblies 38 are located around the periphery of the battery pack 18 and therefore establish peripheral attachment points for securing the battery pack 18 to the vehicle frame 28. The peripheral attachment points generally do not require sealing. Each attachment assembly 38 may include one or more mechanical fasteners, such as rigid bolts or screws. Other types of fasteners could also be used within the scope of this disclosure. The total number of attachment assemblies 38 employed to mount the battery pack at the peripheral attachment points may vary per design and is therefore not intended to limit this disclosure.

Depending on the size of the battery pack 18, the span between the side rails 30 may be relatively large. The large span can affect the durability of the battery pack 18 and the vehicle frame 28 and my influence noise, vibration, and harshness of these components. Therefore, a plurality of attachment and sealing assemblies 40 may additionally be employed for mounting the battery pack 18 relative to the vehicle frame 28. The attachment and sealing assemblies 40 are located inside of the outer periphery of the battery pack 18 and may therefore establish mid-span attachment points for securing the battery pack 18 to the vehicle frame 28. In an embodiment, the attachment and sealing assemblies 40 are located axially between the peripherally located attachment assemblies 38. The total number of attachment and sealing assemblies 40 employed to mount the battery pack 18 at the mid-span attachment points may vary per battery pack design and is therefore not intended to limit this disclosure.

Figure 3:
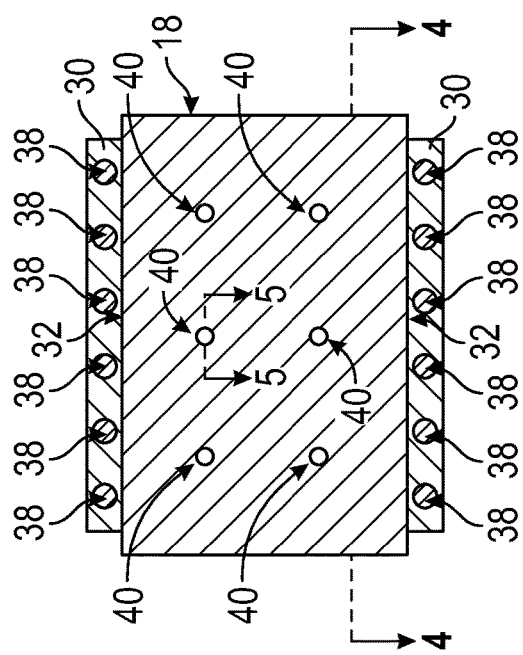
FIG. 3 illustrates an exemplary battery pack of an electrified vehicle.

Although shown in FIGS. 2-3 as being mounted using both the attachment assemblies 38 and the attachment and sealing assemblies 40, the battery pack 18 could in some embodiments be mounted using only the attachment and sealing assemblies 40.

Due to their mid-span mounting locations, the attachment and sealing assemblies 40 may extend at least partially through sealed areas of the battery pack 18. The attachment and sealing assemblies 40 must therefore be capable of both sealing and securing the battery pack 18 relative to nearby vehicle structures. Exemplary attachment and sealing assemblies for sealing holes or openings formed through the battery pack 18 and the vehicle frame 28 in order to accommodate the attachment and sealing assemblies 40 are therefore proposed in this disclosure.

Figure 4:
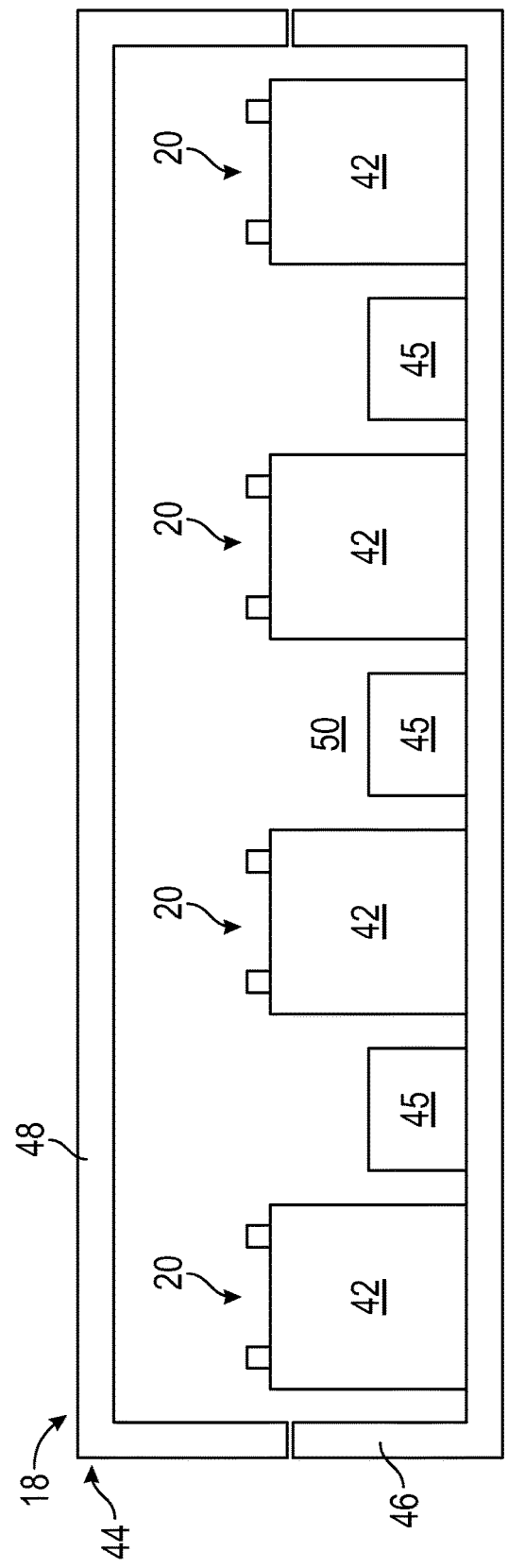
FIG. 4 is a cross-sectional view through section 4-4 of FIG. 3.

Referring now primarily to FIG. 4, the battery pack 18 may house a plurality of battery cells 42 that store energy for powering various electrical loads of the electrified vehicle 12, such as the electric machine 12 of FIG. 1, for example. In an embodiment, the battery pack 18 houses prismatic, lithium-ion cells. However, battery cells having other geometries (cylindrical, pouch, etc.), other chemistries (nickel-metal hydride, lead-acid, etc.), or both could alternatively be utilized within the scope of this disclosure. Although not shown, the battery pack 18 may additionally house one or more internal electronic components, including but not limited to, a bussed electrical center (BEC), a battery electric control module (BECM), wiring harnesses, wiring, I/O connectors, etc., and a battery thermal management system for thermally managing the battery cells 42.

The battery cells 42 may be grouped together in one or more battery arrays 20. In an embodiment, the battery pack 18 includes four battery arrays 20. However, the total numbers of battery cells 42 and battery arrays 20 employed within the battery pack 18 are not intended to limit this disclosure.

A battery internal structure 45, such as a relatively rigid cross member, may be positioned between each adjacent set of battery arrays 20. In general, the battery internal structures 45 add rigidity to the battery pack 18 and establish mounting points for securing the attachment and sealing assemblies 40 to the battery pack 18. The battery internal structures 45 may be arranged in a cross-car orientation, a longitudinal direction, or both. The total number of battery internal structures 45 provided inside the battery pack 18 is not intended to limit this disclosure.

An enclosure assembly 44 may house each battery array 20 of the battery pack 18. Since the battery arrays 20 and other battery electronic components are housed inside the enclosure assembly 44, these components are considered battery internal components of the battery pack 18. Although an example placement of the battery arrays 20 is shown in FIG. 4, this particular placement is exemplary only and is therefore not intended to limit this disclosure. The battery internal components of the battery pack 18 can be arranged in any configuration inside the enclosure assembly 44.

In an embodiment, the enclosure assembly 44 is a sealed enclosure. The enclosure assembly 44 may include any size, shape, and configuration within the scope of this disclosure. The enclosure assembly 44 may include a tray 46 and a cover 48. The tray 46 and the cover 48 cooperate to surround and enclose the battery arrays 20. The tray 46 may provide an open area 50 for holding the battery arrays 20. After positioning the battery arrays 20 within the open area 50, the cover 48 may be seated and sealed to the tray 46 to enclose the battery arrays 20 therein.

In an embodiment, the enclosure assembly 44 is a metallic-based component. For example, the tray 46 and the cover 48 could be constructed out of aluminum or steel. However, other materials, including polymer-based materials, may also be suitable for constructing the components of the enclosure assembly 44.

Figure 5:
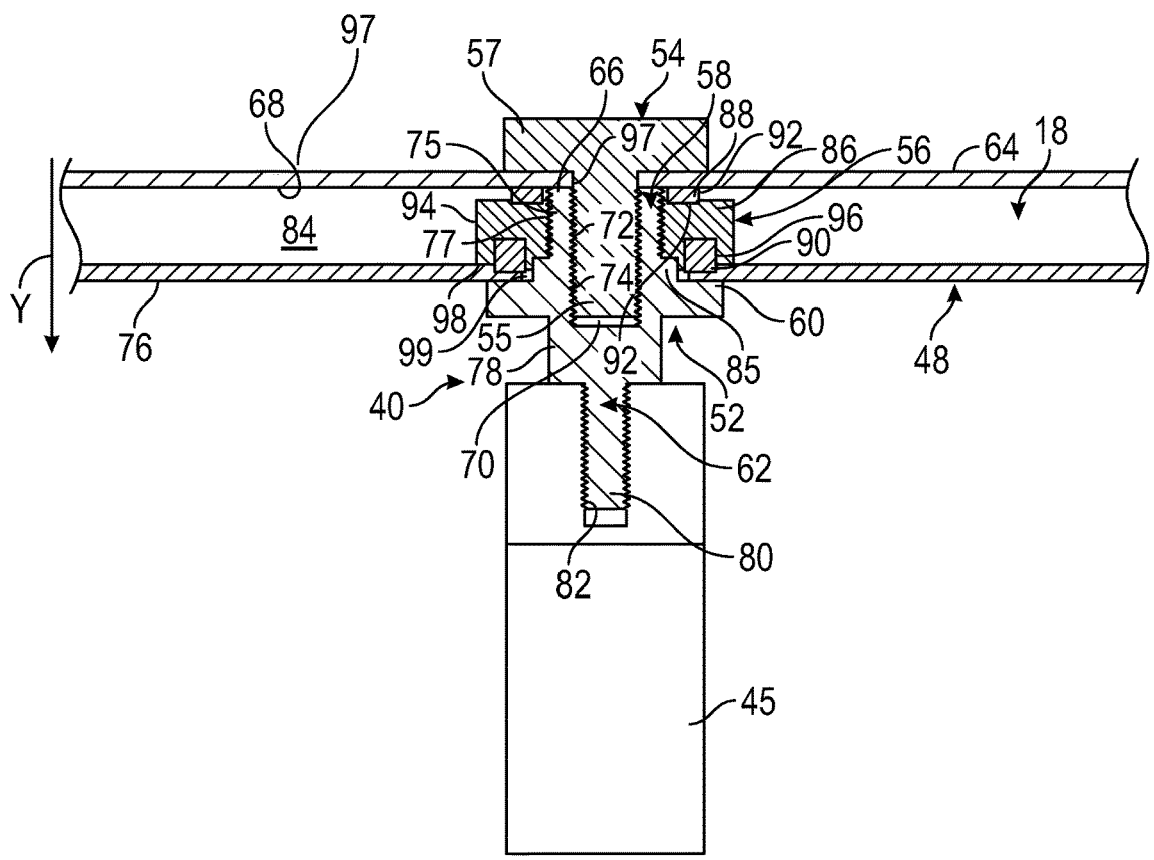
FIG. 5 is a cross-sectional view through section 5-5 of FIG. 3 and illustrates an exemplary attachment and sealing assembly of the battery pack according to an embodiment of this disclosure.
Figure 6:
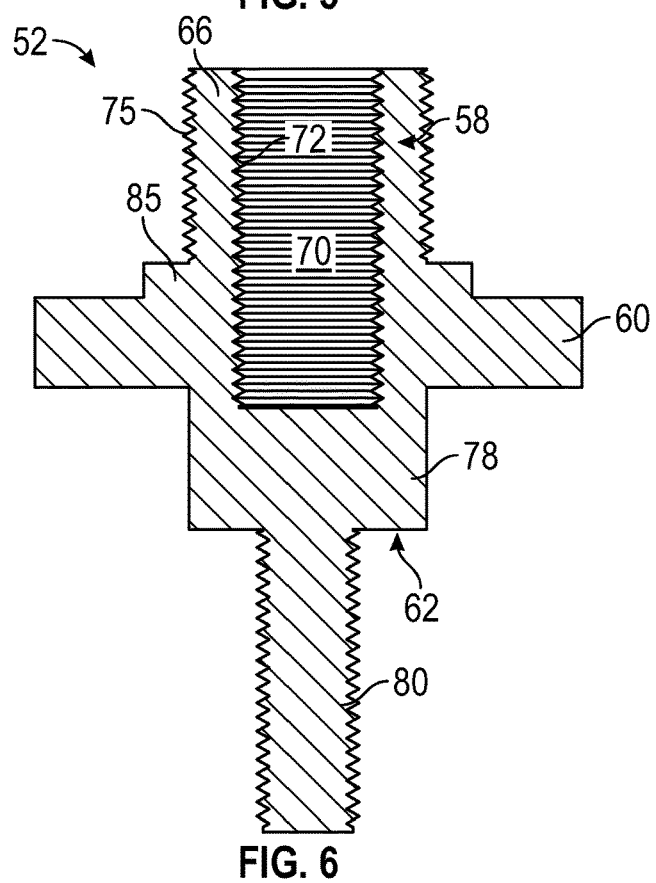
FIG. 6 illustrates an attachment column of the attachment and sealing assembly of FIG. 5.

FIG. 5, with continued reference to FIGS. 1-4, illustrates an exemplary attachment and sealing assembly 40 for establishing a mid-span attachment point of the battery pack 18. The exemplary attachment and sealing assembly 40 may include an attachment column 52 (shown alone in FIG. 6) and a sealing ring 56. These components and their respective designs and functions are described in greater detail below.

The attachment column 52 of the attachment and sealing assembly 40 may extend through the cover 48 and then connect to a portion of the battery internal structure 45. The attachment column 52 may include a tube 58, a flange 60, and a stanchion 62. The tube 58 may extend in a first direction from the flange 60 (i.e., toward the vehicle body component 64 to which the battery pack 18 is mounted), and the stanchion 62 may extend in a second direction from the flange 60 (i.e., toward the battery internal structure 45). In a mounted position of the attachment column 52, the stanchion 62 may extend inside the battery internal structure 45, and an upper edge 66 of the tube 58 may abut against an undersurface 68 of the vehicle body component 64. The vehicle body component 64 may be the floor pan 26, one of the rails 34, one of the cross members 36, or any of other component of the vehicle frame 28.

In an embodiment, the tube 58 is configured as a sleeve that includes a hollow passage 70. The hollow passage 70 may include a threaded portion 72 for threadably engaging threads 74 of a fastener 54. The fastener 54 may be inserted through the vehicle body component 64 and then into the tube 58 for securing the battery pack 18 relative to the vehicle body component 64.

The tube 58 may additionally include a threaded portion 75 on an outer diameter of the tube 58. The threaded portion 75 may engage a threaded portion 77 of the sealing ring 56 as the sealing ring 56 is received over the tube 58.

The flange 60 may extend in a radially outward direction relative to the tube 58 and the stanchion 62. In an embodiment, the flange 60 is hexagon shaped. However, other shapes are also contemplated within the scope of this disclosure. The flange 60 may be utilized to insert (e.g., by screwing) the stanchion 62 into the battery internal structure 45. For example, a tool (not shown) may be received about the flange 60 in order to screw the stanchion 62 into the battery internal structure 45. In a mounted position of the attachment column 52, the flange 60 may abut against an undersurface 76 of the cover 48. The flange 60 therefore provides a surface against which the cover 48 may clamp against.

The stanchion 62 may include a base 78 and a threaded portion 80. The base 80 is connected to the flange 60, and the threaded portion 80 may extend outwardly from the base 78. The threaded portion 80 may be received by a threaded opening 82 of the battery internal structure 45.

The sealing ring 56 may be received over the threaded portion 75 of the tube 58. In an embodiment, the sealing ring 56 is attached to the tube 58 after positioning the cover 48 over the tube 58. In its mounted positon, the sealing ring 56 is received within a space 84 that extends between the vehicle body component 64 and the cover 48 of the battery pack 18. The upper edge 66 of the tube 58 may extend past the sealing ring 56 and directly abut against the undersurface 68 of the vehicle body component 64. The upper edge 66 therefore provides a surface against which the vehicle body component 64 may clamp against.

The sealing ring 56 may include a body 86, a first seal 88, and a second seal 90. The body 86, which may be a metallic or plastic body, includes a first groove 92 formed in an outer surface 94 and a second groove 96 formed in an inner surface 98 of the body 86.

The first seal 88 may be received within the first groove 92 and the second seal 90 may be received within the second groove 96. In an embodiment, the first seal 88 and the second seal 90 are O-ring seals. However, other types of seals may also be suitable.

Once the sealing ring 56 is positioned over the tube 58, the first seal 88 seals an opening 97 formed in the vehicle body component 64 and the second seal 90 seals an opening 99 formed in the cover 48 of the battery pack 18. The first and second seals 88, 90 substantially prevent the ingress of water, dirt, or other unwanted debris from entering inside the battery pack 18 through the openings 97, 99.

A circular ledge 85 may be disposed at an interface between the tube 58 and the flange 60. The circular ledge 85 may extend at least partially through the opening 99 in the cover 48 and then abut against the inner surface 98 of the sealing ring 56. The circular ledge 85 therefore provides a surface against which the sealing ring 56 may clamp against.

The fastener 54 may be received through the opening 97 of the vehicle body component 64 and then extend into the hollow passage 70 of the tube 58. In an embodiment, the fastener 54 is configured as a bolt that includes a threaded stud 55 and a head 57 that protrudes radially outwardly from the threaded stud 55. The fastener 54 may be inserted using a top-down approach (i.e., in a direction Y that extends from the vehicle body component 64 toward the ground). Therefore, in a mounted position, the head 57 of the fastener 54 may be received in abutting engagement with the vehicle body component 64, and the threaded stud 55 may be screwed into the threaded portion 72 of the hollow portion 70 of the tube 58.

Figure 7:
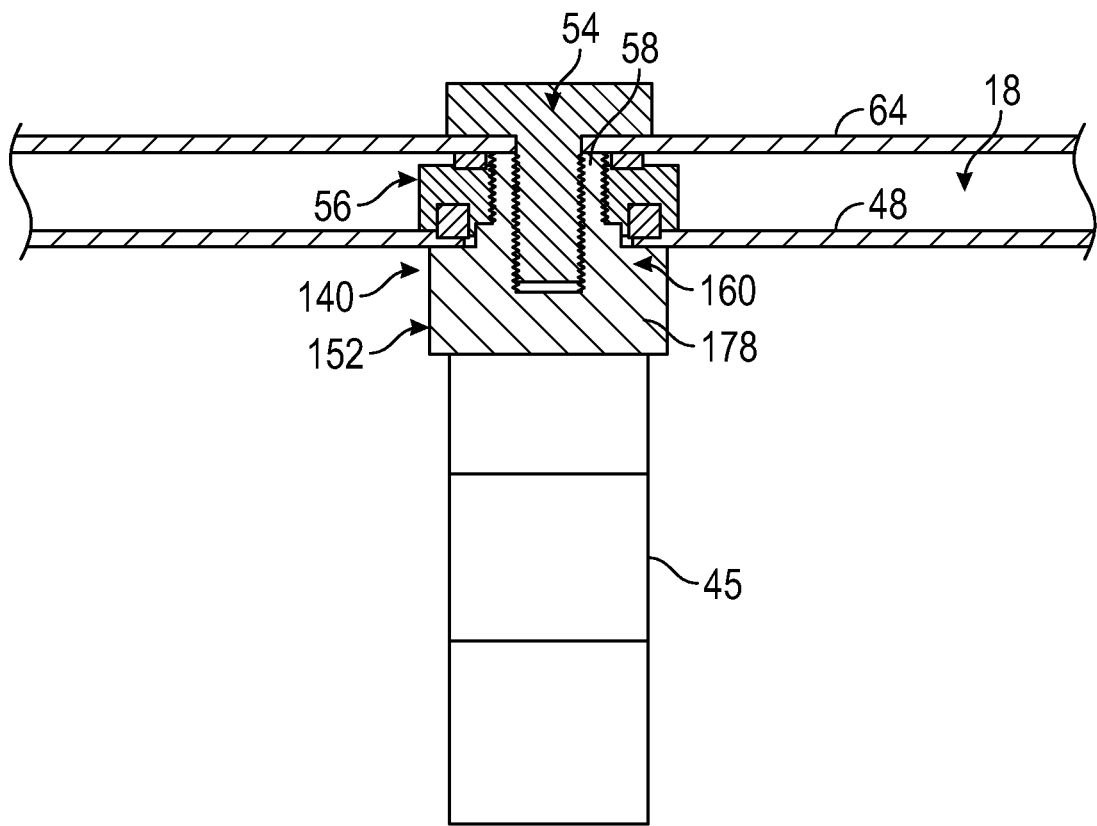
FIG. 7 illustrates an attachment and sealing assembly according to another embodiment of this disclosure.

FIG. 7, with continued reference to FIGS. 1-4, illustrates another exemplary attachment and sealing assembly 140 for establishing a mid-span attachment point of the battery pack 18. The exemplary attachment and sealing assembly 140 is similar to the assembly 40 of FIG. 5 and may include an attachment column 152 and a sealing ring 56. However, in this embodiment, the attachment column 152 lacks the stanchion 62. Instead, a base 178 of a flange 160 of the attachment column 152 may be welded to the battery internal structure 45 in order to secure the attachment column 152 in place inside the battery pack 18.

Figure 8:
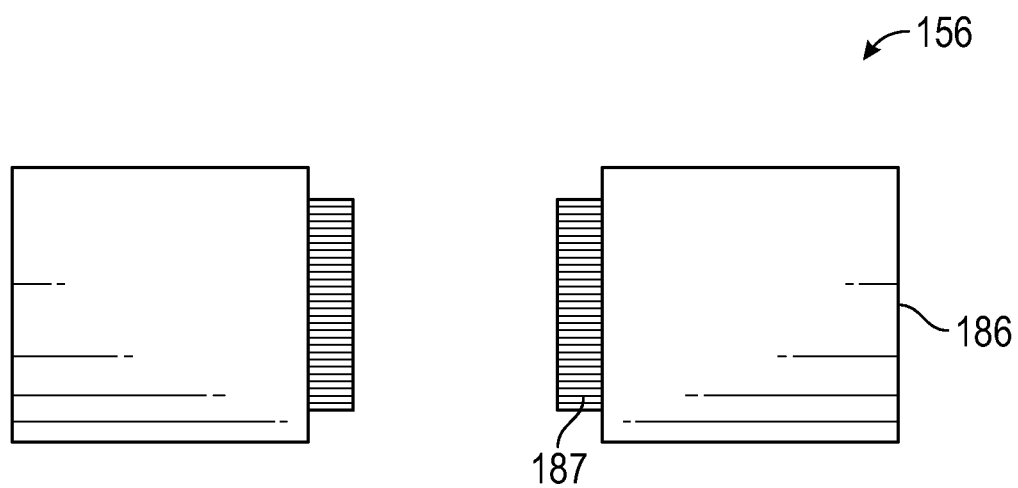
FIG. 8 illustrates an exemplary sealing ring that can be employed by the attachment and sealing assemblies of this disclosure.

FIG. 8, with continued reference to FIGS. 1-7, illustrates another exemplary design of a sealing ring 156 that can be used within any of the attachment and sealing assemblies described above. The sealing ring 156 may include a body 186 and a threaded internal sleeve 187. In an embodiment, the body 186 is a rubber gasket that is configured for sealing the openings formed in a vehicle body component and a battery pack enclosure assembly. The threaded internal sleeve 187 is configured to be received over the threaded portion 75 of the outer diameter of the tube 58 of the attachment column 52, in an embodiment.

The attachment and sealing assemblies of this disclosure enable simple and cost effective mounting solutions for establishing mid-span battery pack attachment points. The unique attachment and sealing strategies discussed herein provide a solid sealed joint with a minimal amount of necessary parts. The attachment and sealing assemblies may provide battery sealing even when the battery pack is not attached to the vehicle and may be easily removed for providing quick and efficient battery pack serviceability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure assembly;
   a battery array housed inside the enclosure assembly;
   a battery internal structure adjacent to the battery array, wherein the battery internal structure is a cross member that extends upwardly from a tray of the enclosure assembly; and
   an attachment and sealing assembly including:
      an attachment column connected to the battery internal structure and extending through a portion of the enclosure assembly; and
      a sealing ring received around a portion of the attachment column.

2. The battery pack as recited in claim 1, wherein the attachment and sealing assembly establishes a mid-span attachment point of the battery pack.

3. The battery pack as recited in claim 2, comprising an attachment assembly that establishes a peripheral attachment point of the battery pack.

4. The battery pack as recited in claim 1, wherein the portion of the attachment column is a tube.

5. The battery pack as recited in claim 4, wherein the tube extends through a cover of the enclosure assembly, and an upper edge of the tube abuts against an undersurface of a vehicle body component to which the battery pack is mounted.

6. A battery pack, comprising:
an enclosure assembly;
a battery array housed inside the enclosure assembly;
a battery internal structure adjacent to the battery array; and
an attachment and sealing assembly including:
an attachment column connected to the battery internal structure and extending through a portion of the enclosure assembly;
a sealing ring received around a portion of the attachment column; and
a fastener secured to a threaded portion of a hollow passage of a tube of the attachment column.

7. The battery pack as recited in claim 1, wherein the attachment column includes a tube that extends through a cover of the enclosure assembly and a stanchion that extends into the battery internal structure.

8. The battery pack as recited in claim 7, wherein a threaded portion of the stanchion engages a threaded opening formed in the battery internal structure.

9. The battery pack as recited in claim 1, wherein the attachment column includes a flange, a tube that extends in a first direction from the flange, and a stanchion that extends in a second direction from the flange.

10. The battery pack as recited in claim 9, comprising a circular ledge disposed at an interface between the tube and the flange.

11. The battery pack as recited in claim 10, wherein the flange is received against an underside of a cover of the enclosure assembly, and the circular ledge is received against an inner surface of the sealing ring.

12. The battery pack as recited in claim 1, wherein the sealing ring includes a body, a first seal received in a first groove of the body, and a second seal received in a second groove of the body.

13. The battery pack as recited in claim 1, wherein the sealing ring includes a rubber gasket and a threaded internal sleeve.

14. An electrified vehicle, comprising:
a vehicle body component;
a battery pack mounted to the vehicle body component; and
an attachment and sealing assembly that establishes a mid-span connection point for securing the battery pack to the vehicle body component,
wherein the attachment and sealing assembly includes an attachment column and a sealing ring disposed about a tube of the attachment column.

15. The electrified vehicle as recited in claim 14, wherein the vehicle body component is a floor pan or a rail of a vehicle frame.

16. The electrified vehicle as recited in claim 14, wherein the attachment column is connected to a battery internal structure of the battery pack.

17. The electrified vehicle as recited in claim 16, wherein a stanchion of the attachment column is received by a threaded opening formed in the battery internal structure.

18. The electrified vehicle as recited in claim 14, wherein the sealing ring includes a body, a first seal received in a first groove of the body, and a second seal received in a second groove of the body, and the first seal seals a first opening formed in the vehicle body component and the second seal seals a second opening formed in an enclosure assembly of the battery pack.

19. The electrified vehicle as recited in claim 14, comprising a fastener connected to the tube of the attachment column, wherein the fastener extends through an opening formed in the vehicle body component, and a threaded stud of the fastener engages a threaded portion formed in a hollow passage of the tube.

20. The electrified vehicle as recited in claim 14, wherein the sealing ring is positioned within a space that extends between the vehicle body component and a cover of the battery pack.

* * * * *